United States Patent [19]

Smith et al.

[11] Patent Number: 4,574,165

[45] Date of Patent: Mar. 4, 1986

[54] SECRETARIAL ANSWERING SYSTEM

[75] Inventors: Louis W. Smith, St. Petersburg, Fla.; Janos I. Csapo, Oakton, Va.

[73] Assignee: GTE Business Communication Systems Inc., Northlake, Ill.

[21] Appl. No.: 540,463

[22] Filed: Oct. 11, 1983

[51] Int. Cl.$^4$ .................. H04M 3/50; H04M 3/58
[52] U.S. Cl. ........................ 179/18 BD; 179/27 FH
[58] Field of Search .......... 179/18 BD, 18 B, 18 AD, 179/27 FH, 27 FG, 18 AB

[56] References Cited

U.S. PATENT DOCUMENTS

| | | | |
|---|---|---|---|
| 4,296,282 | 10/1981 | O'Neil et al. | 179/99 LS |
| 4,351,986 | 9/1982 | Fechalos | 179/27 FH |
| 4,436,963 | 3/1984 | Cottrell et al. | 179/18 B |

Primary Examiner—Thomas W. Brown
Attorney, Agent, or Firm—Gregory G. Hendricks

[57] ABSTRACT

A secretarial answering system for use with a switching system which includes a plurality of subscriber telephone stations each equipped with a buzzer, and a secretarial telephone station equipped with an audible signalling circuit and a plurality of lamp and switch pairs. A line circuit is connected to each subscriber station and monitors its busy, idle and ringing status. A processing unit periodically scans the line circuits to determine changes in the status of the subscriber stations. This processing unit then transmits subscriber station status and identification information to the secretarial telephone station. The secretarial station uses this information to provide visual and audible indications of subscriber station status. In response to operation of the switch associated with a called subscriber station, a directed call pick up or a call transfer message is transmitted by the secretarial station to the switching system. A buzzing requested message is also transmitted to the processing unit in association with the call transfer message. The directed call pick up message identifies the subscriber station whose incoming call is to be transferred to the secretarial station for screening. The call transfer message identifies the subscriber station which is to receive a screened call. The buzzing requested message informs the processing unit to cause the called subscriber station's buzzer to provide an audible signal indicating that the current incoming call has been screened by a secretary.

14 Claims, 10 Drawing Figures

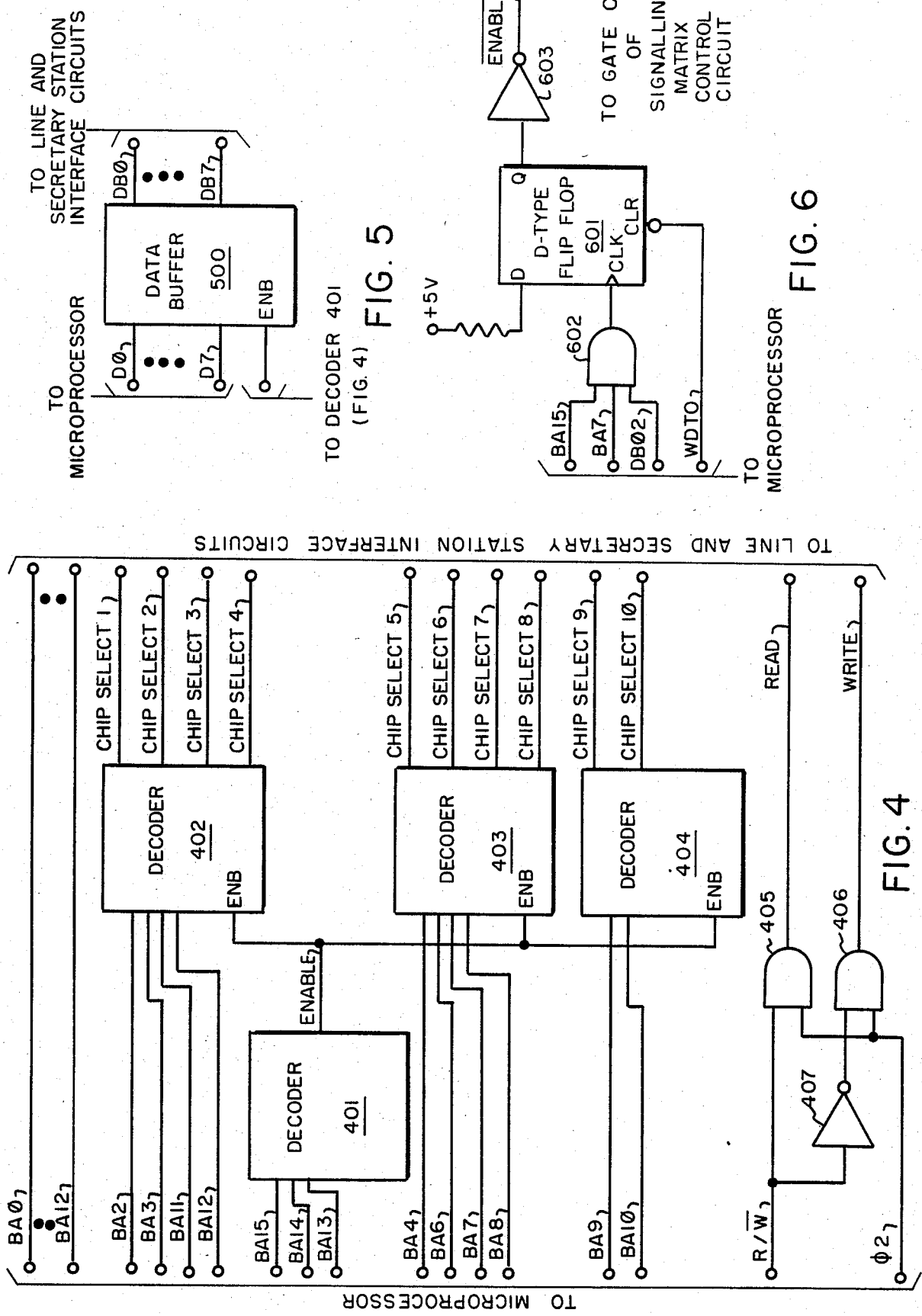

SECRETARIAL ANSWERING SYSTEM

CROSS REFERENCE TO RELATED APPLICATION

The present application is related to the following co-pending and commonly assigned patent applications, all of which were concurrently filed in the names of the same inventors: Ser. No. 540,464, entitled "SECRETARIAL ANSWERING SYSTEM WITH DISTRIBUTED PROCESSING"; Ser. No. 540,465, entitled "SECRETARIAL TELEPHONE STATION FOR USE WITH A SECRETARIAL ANSWERING SYSTEM"; and Ser. No. 540,462, entitled "SECRETARIAL TELEPHONE STATION WITH DISTRIBUTED PROCESSING FOR USE WITH A SECRETARIAL ANSWERING SYSTEM". Also related is U.S. Pat. No. 4,453,040, entitled "TELEPHONE FEATURE ASSIGNMENT CIRCUIT", issued on June 5, 1984 to L. W. Smith and A. L. Wolf.

FIELD OF THE INVENTION

The present invention relates to telephone switching systems and more particularly to a secretarial telephone answering system..

BACKGROUND OF THE INVENTION

Secretarial telephone answering systems and secretarial telephone stations are old and well known. These systems and stations are connected to a switching system or private automatic branch exchange (PABX) having directed call pickup and call transfer features. Typically these systems included a complex secretarial telephone station connected directly to the PABX. In addition, each individual subscriber telephone station, which is to receive secretarial answering service, is also connected to the secretarial station. With such an arrangement a large and unwieldy cable comprising the line pairs for each such subscriber station are connected to the secretarial station. This arrangement involves heavy cabling cost both for installation and maintenance. Also, if the location of the secretarial station is to be changed, extensive recabling is required.

An alternative arrangement for providing the secretarial answering service, requires the secretary to identify which telephone is ringing by listening to the ringing signal from the called subscriber station. The secretary then dials the telephone number of the ringing subscriber station in the directed call pickup mode in order to intercept the incoming call. Once the call has been screened by the secretary the number of the called telephone station must again be dialed from the secretarial station in the call transfer mode. This is a cumbersome and lengthy procedure and is difficult to implement when several calls must be intercepted and transferred at approximately the same time.

SUMMARY OF THE INVENTION

In accordance with the present invention, a secretarial telephone answering system is provided for use with a telephone switching system including a switching center, and both a secretarial telephone station and a plurality of subscriber telephone stations all connected to the switching center. The switching center is operative to apply a ringing signal to a called subscriber station. The subscriber station is operative to provide busy and idle signals and the secretarial station is operative to provide a buzzing requested message, including a code identifying the called subscriber station.

The telephone answering system includes a processing unit connected to the secretarial station and a plurality of line circuits each connected to the processing unit and an associated one of the subscriber stations.

Each of the line circuits is operative in response to detection of the busy, idle and ringing signals at an associated called subscriber station to provide busy, idle and ringing detected signals, respectively.

The processing unit is operative to periodically scan the line circuits for the busy, idle and ringing detected signals and upon detection thereof, it is operative to apply to the secretarial station, busy, idle and ringing detected messages, each including a busy, idle or ringing detected code, respectively, and a code indentifying the associated subscriber station. The processing unit is further operative in response to the buzzing requested message to apply a buzzing control signal to the line circuit associated with the called subscriber station; and the line circuit is operative in response to the buzzing control signal to apply a buzzing signal (approximately ½ second) to the called subscriber station.

DESCRIPTION OF THE DRAWINGS

FIG. 4 is a logic diagram of the I/O ADDRESS/CONTROL circuit shown in FIG. 2;

FIG. 5 is a logic diagram of the I/O DATA XCVR circuit shown in FIG. 2;

FIG. 6 is a logic diagram of the MATRIX ENABLE circuit shown in FIG. 2;

DESCRIPTION OF THE PREFERRED EMBODIMENT

Figure 1:
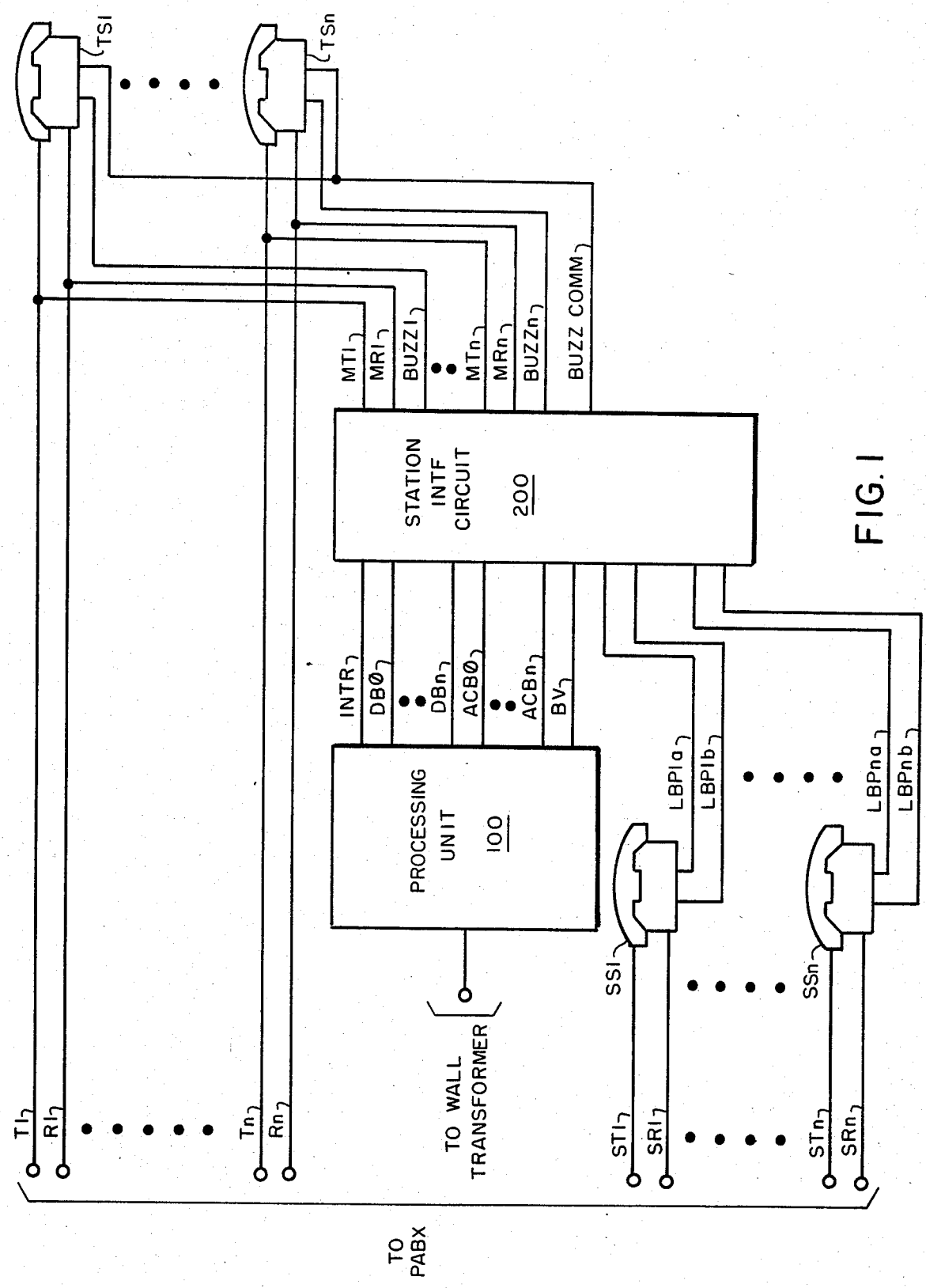
FIG. 1 is a block diagram of the secretarial answering system and secretarial telephone station of the present invention.

Referring now to FIG. 1 of the accompanying drawing, the secretarial telephone answering system and secretarial telephone stations of the present invention are shown connected to a private automatic branch exchange (PABX) which is further connected to a plurality of subscriber telephone stations.

Processing unit 100 is shown connected to a wall transformer and to station interface circuit 200. This station interface circuit is typically connected to a maximum of 30 subscriber stations and four secretarial stations. These subscriber stations can be full featured electronic feature phones or plain old telephone service (POTS) telephones equipped with a buzzer. Each subscriber station is connected to the PABX via tip and ring leads, e.g., T1 and R1. Each of these subscriber stations is further connected to an associated line circuit in station interface circuit 200 via monitored tip and ring leads, e.g., MT1 and MR1, a buzzer signalling lead, e.g., BUZZ 1, and a common buzzer control lead (BUZZ COMM).

Each secretarial station is also connected to the PABX and to the station interface circuit. For example, secretarial station 1 is connected to the PABX via tip and ring leads ST1 and SR1, respectively, and it is further connected to station interface circuit 200 via a pair of link bus protocol leads LBPla and LBPlb. Processing unit 100 is connected to station interface circuit 200 via interrupt lead INTR1, data bus leads DPO-DBN, address and control bus leads ACBO-ACBN and buzzing voltage leads BV.

With this arrangement cabling cost for the secretarial telephone answering system is virtually eliminated since processing unit 100 and station interface circuit 200 are located adjacent to the PABX. Therefore, the subscriber telephone stations TS1-TSn are connected to the line circuits at the PABX rather then running a thick cable including two line pairs, for each subscriber station, from the PABX to a remote secretarial station. However, in accordance with the present invention the secretarial stations can still be remotely located without incurring excessive cable cost since only one pair of link bus protocol leads need be connected between the station interface circuit and an associated secretarial station.

In order for a secretary to provide secretarial telephone answering service the secretary must be able to monitor the busy, idle or ringing status of connected subscriber stations. Thus visual and audible indications of such status for each subscriber station must be available to the secretary at the secretarial station. Each secretarial station is therefore equipped with a lamp for each monitored subscriber station and an electronic ringer. Each such lamp is dark, lit or flashing when the associated subscriber station is idle, busy or ringing, respectively. Information to cause these visual indications is provided to the secretarial station by processing unit 100 and station interface circuit 200 via the link bus protocol leads, LBPla-b.

When an incoming call is made to a particular subscriber station via the PABX, the associated lamp flashes at the secretarial station. A secretary then causes that call to be routed to the secretarial station by the directed call pickup feature in the PABX. This feature is initiated at the secretarial station by operation of a direct station selection switch associated with the ringing subscriber station. Operation of such switch causes the secretarial station to transmit a directed call pickup signal and the telephone number of the called subscriber station to the PABX. The PABX detects the directed call pickup signal and reroutes the incoming call from the called subscriber station to the secretarial station. The secretary can then answer the call for screening purposes.

In the event that the secretary, after screening a call, desires to transfer it back to the called subscriber station, the secretary again operates the direct station selection switch associated with the called subscriber station. The secretarial station responds to this second operation of the direct station selection switch by transmitting a call transfer access code and the telephone number associated with the original called subscriber station to the PABX. The secretarial station also transmits a message to the station interface circuit to cause it to buzz the called subscriber station for a short time (approximately ½ second). This buzzing signal alerts the station subscriber that the current incoming call was previously screened by a secretary.

The PABX then routes the incoming call away from the secretarial station and back to the called subscriber station and applies ringing current to it. The station interface circuit continues to monitor the ringing, busy and idle status of the called subscriber station and presents this information in visual form, as indicated by the dark, lit or flashing light associated with that called subscriber station.

Figure 2:
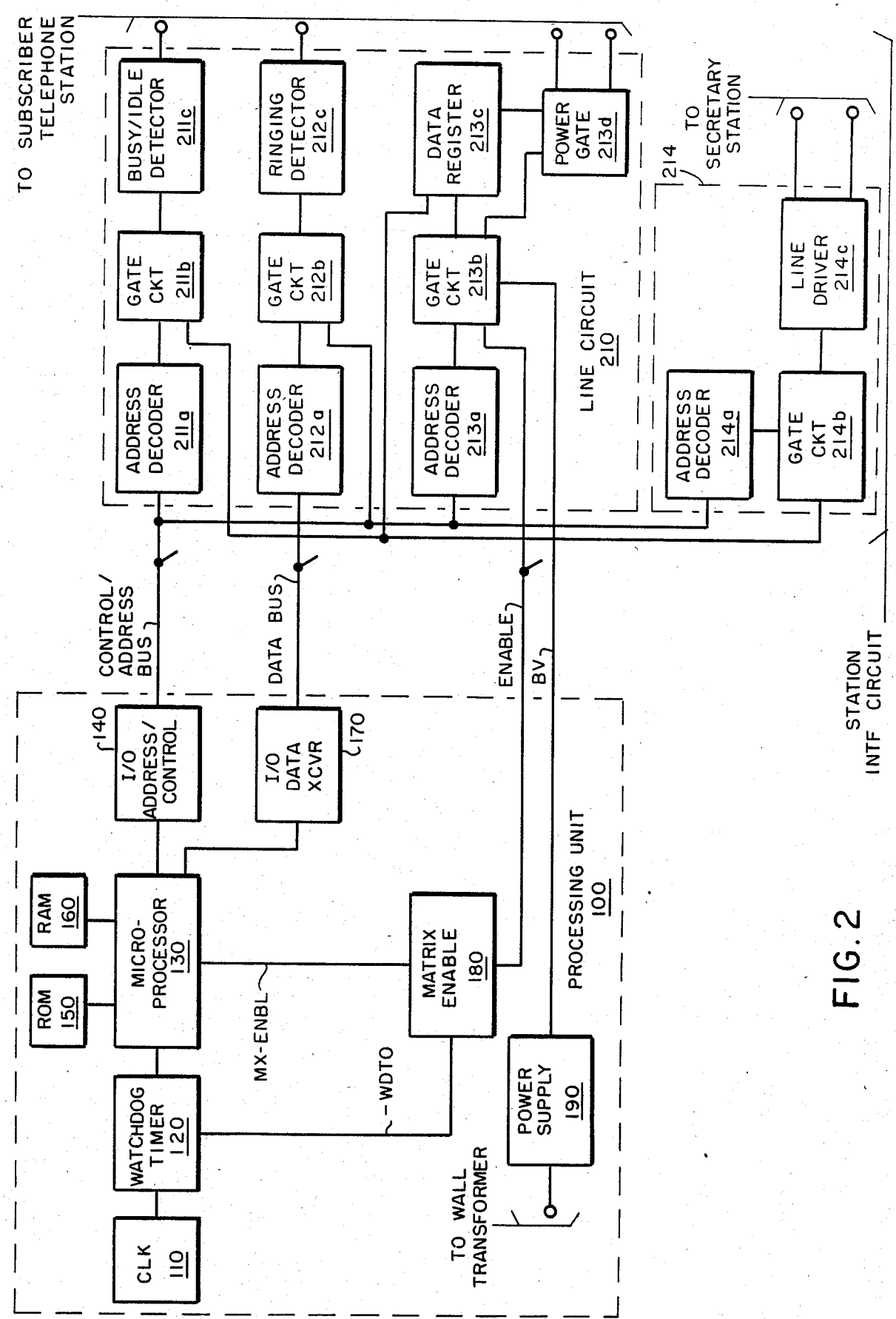
FIG. 2 is a block diagram of the processing unit and station interface circuit shown in FIG. 1.

Referring now to FIG. 2, processing unit 100 and station interface circuit 200, of FIG. 1, are shown. Processing unit 100 includes Clock circuit 110 which is connected to Watch Dog Timer 120. This timer is further connected to Matrix Enable circuit 180 and Microprocessor 130 which is connected to Read-Only-Memory (ROM) 150 and Random-Access-Memory (RAM) 160. Microprocessor 130 is also connected to I/O Address/Control circuit 140, I/O Data Transceiver 170, and Matrix Enable circuit 180. Power supply 190 is connected between a wall transformer and Switching Matrix (Power Gate circuit) 213d in station interface circuit 200.

Clock circuit 110 includes a 2 MHz crystal oscillator to provide a source for all timing signals. Watch Dog Timer 120 includes a divider which must be reset every second by Microprocessor 130 in order to prevent generation of a watch-dog-time-out signal.

I/O Address/Control circuit 140 includes storage registers which are loaded by Microprocessor 130 with data bits representing the address of devices to be written into or read from. This I/O Address/Control circuit also includes registers to store read and write control signals from Microprocessor 130.

I/O Data Transceiver 170 includes registers which store data bits being transferred from Microprocessor 130 to various external circuits when the microprocessor is writing into those circuits. These registers also store data bits from the external circuits when the microprocessor is reading from these external circuits.

Matrix Enable circuit 180 includes gating circuitry which provides an Enable signal when Microprocessor 130 does not provide a disable signal and Watch Dog Timer 120 does not provide a watch-dog-time-out signal. The Enable signal is applied to Station Interface circuit 200 in order to ensure that external signalling is only performed when the Processing Unit 100 is operating properly. For example, the Enable signal is not generated when there is a watch-dog-time-out since this indicates a software or hardware malfunction. Also the Enable signal is not provided when Microprocessor 130 applies a Disable signal to matrix enable circuit 180. This Disable signal is provided under software control in the event of various processing unit failures such as a power failure. In this manner external signalling is only performed when Processing Unit 100 is operating properly, thus ensuring the validity of any external signals applied to Station Interface circuit 200, the various subscriber stations and the secretarial station.

Power Supply 190 provides a low voltage BUZZ signal which is applied to Station Interface circuit 200. This signal is used to alert the selected subscriber station that an incoming call has been screened by the secretary.

Station Interface circuit 200 includes a plurality of Line circuits 210 and at least one Secretarial Interface circuit 214. Line circuit 210 includes Busy/Idle Detector circuit 211a-c, Ringing Detector circuit 212a-c and Signalling Matrix Control circuit 213a-c. Each of these circuits is connected to both I/O Address/Control circuit 140 and I/O Data Transceiver 170. Signalling Matrix Control circuit 213a-c is further connected to Matrix Enable circuit 180. Switching matrix (Power Gate) circuit 213d is connected to Signalling Matrix Control circuit 213a-c and Power Supply circuit 190. Busy/Idle Detector circuit 210 and Ringing Detector circuit 220 are further connected to associated subscriber stations in order to monitor their busy, idle and ringing status. Similarly switching matrix 213d is connected to an associated subscriber station via the BUZZ signalling and BUZZ COMM leads. Processing unit 100 is thus able to apply a buzzing signal to a selected telephone station via these leads.

Secretarial Interface circuit 214 includes Address Decoder 214a, which connected to I/O Address/Control circuit 140, Gate circuit 214b which is connected to I/O Data Transceiver 170 and Line Driver 214c which is connected between Gate circuit 214b and an associated secretarial station. Gate circuit 214b is further connected to Address Decoder 214a.

Busy/Idle Detector circuit 211a-c and Ringing Detector circuit 212a-c each monitor the associated subscriber station for changes in busy, idle and ringing status of that subscriber station. Microprocessor 130 periodically scans these detector circuits to determine the busy, idle and ringing status of the associated subscriber stations. This periodic scanning is done at 10 millisecond intervals under control of a 100 Hz real time clock signal from Clock circuit 110.

In order to scan the detector circuits, 211a-c and 212a-c, Microprocessor 130 applies the address bits associated with a selected busy/idle or ringing detector to I/O Address/Control circuit 140. Microprocessor 130 also applies a Read signal to this control circuit.

When address decoders 211a and 212a decode their respective address bits and a Read signal, they enable Gate circuits 211b and 212b, respectively. Busy/Idle Detector 211c and Ringing Detector 212c then apply data representative of the busy, idle or ringing status to I/O Data Transceiver 170 via Gate circuts 211b and 212b, respectively. Microprocessor 130 then retrieves such data signals from transceiver 170 and updates a status table in RAM 160.

If a particular subscriber station is receiving an incoming call as indicated by a ringing signal, Ringing Detector circuit 212a-c would detect this ringing signal. This ringing signal status would then be available to Microprocessor 130 on the next scan of Ringing Detector circuit 212a-c. Microprocessor 130 then compares this ringing status with the previous status of that subscriber station as indicated in the status table in RAM 160. Since this particular subscriber station had previously been idle, the change to ringing signal status represents an incoming call for this subscriber station.

Microprocessor 130 then writes the appropriate address bits into I/O Address/Control circuit 140 to select Secretarial Interface circuit 214 in preparation for transmission of a ringing detected message to the secretarial station. Microprocessor 130 also applies Write commands to I/O Address/Control circuit 140 and a serial ringing detected message, to Data Transceiver 170. This ringing detected message indicates ringing status and the identity of the subscriber station which is now receiving an incoming call. Address Decoder 214a responds to its address bits by enabling Gate circuit 214b. The ringing detected message is then serially transmitted to the secretarial station via Gate circuit 214b and line driver 214c.

The connected secretarial station receives this message, retrieves the ringing status information and the subscriber station identification and causes a light to flash which is associatd with that subscriber station. In this manner the secretarial station provides a visual indication that an incoming call is being received at a particular subscriber station. The secretarial station also includes an audible signalling device which is activated in response to receipt of any such message indicating that a subscriber station is receiving an incoming call.

The secretary then depresses a direct station select (DSS) switch associated with the ringing subscriber station. The secretarial station responds to operation of an individual DSS switch by transmitting a directed-call-pick-up message to the PABX via the secretarial station's tip and ring leads (ST and SR). This message includes a code representative of the PABX directed-call-pick-up feature followed by a code identifying the called subscriber station. The PABX then transfers the incoming call from the subscriber station to the secretarial station. After screening the call, if the secretary determines that it should be received at the originally called subscriber station the secretary again operates the DSS switch. This time the secretarial station transmits a buzzing requested message to Station Interface circuit 200. This message includes a code identifying the called subscriber station which will subsequently provide an audible buzzing signal. Microprocessor 130 then receives the buzzing requested message via Line Driver 214c, Gate circuit 214b and I/O Data Transceiver 170, after applying a Read signal and address bits identifying Secretarial Interface circuit 214c to I/O Address/Control circuit 140. This message is then stored in RAM 160.

Since there are no power or other catastrophic failure conditions present, the Disable signal is not applied by Microprocessor 130 to Matrix Enable circuit 180. Similarly since there are no catastrophic software errors the watch-dog-time-out signal is not provided by Watch Dog Timer 120. Consequently, Matrix Enable circuit 180 applies an Enable signal to Gate circuit 213b in signalling matrix control circuit 213a-c.

Microprocessor 130 then applies a Write signal and the address signals representative of signalling matrix control circuit 213a-c to I/O Address/Control circuit 140. It also applies data representative of a buzzing control signal to I/O data transceiver 170. Upon being enabled by its address signals, the Write signal and the Enable signal, Gate circuit 213b enables Data Register 213c to receive the buzzing control signal from I/O data transceiver 170. Data Register 213c then enables Power Gate (Switching Matrix) 213d which then gates the Buzzing Voltage from power supply 190 to the selected subscriber station. This Buzzing Voltage then causes the subscriber station to provide an audible buzzing signal which alerts the subscriber station user that the current incoming call has been screened by the secretary.

The secretarial station further operates in response to this second operation of the DSS switch to transmit a call transfer message to the PABXs via the tip and ring (ST and SR) leads. This message includes a code representative of the PABX call transfer feature followed by a code identifying the called subscriber station. The PABX then transfers the call from the secretarial station to the originally called subscriber station and applies ringing current to it. Thus, the subscriber station user is alerted via the audible buzzing signal that the current incoming (ringing) call has been screened by the secretary.

In the event that the originally called subscriber station became busy while the secretary was screening a call to that station, Microprocessor 130 would have detected this status via Busy/Idle Detector circuit 211a–c. It would then send a message to the secretarial station, via Secretarial Interface circuit 214, to cause that subscriber station's light to become lit, thereby indicating the busy condition of that subscriber station. In this case the secretary would not transfer the call back to the busy subscriber station.

Figure 3:
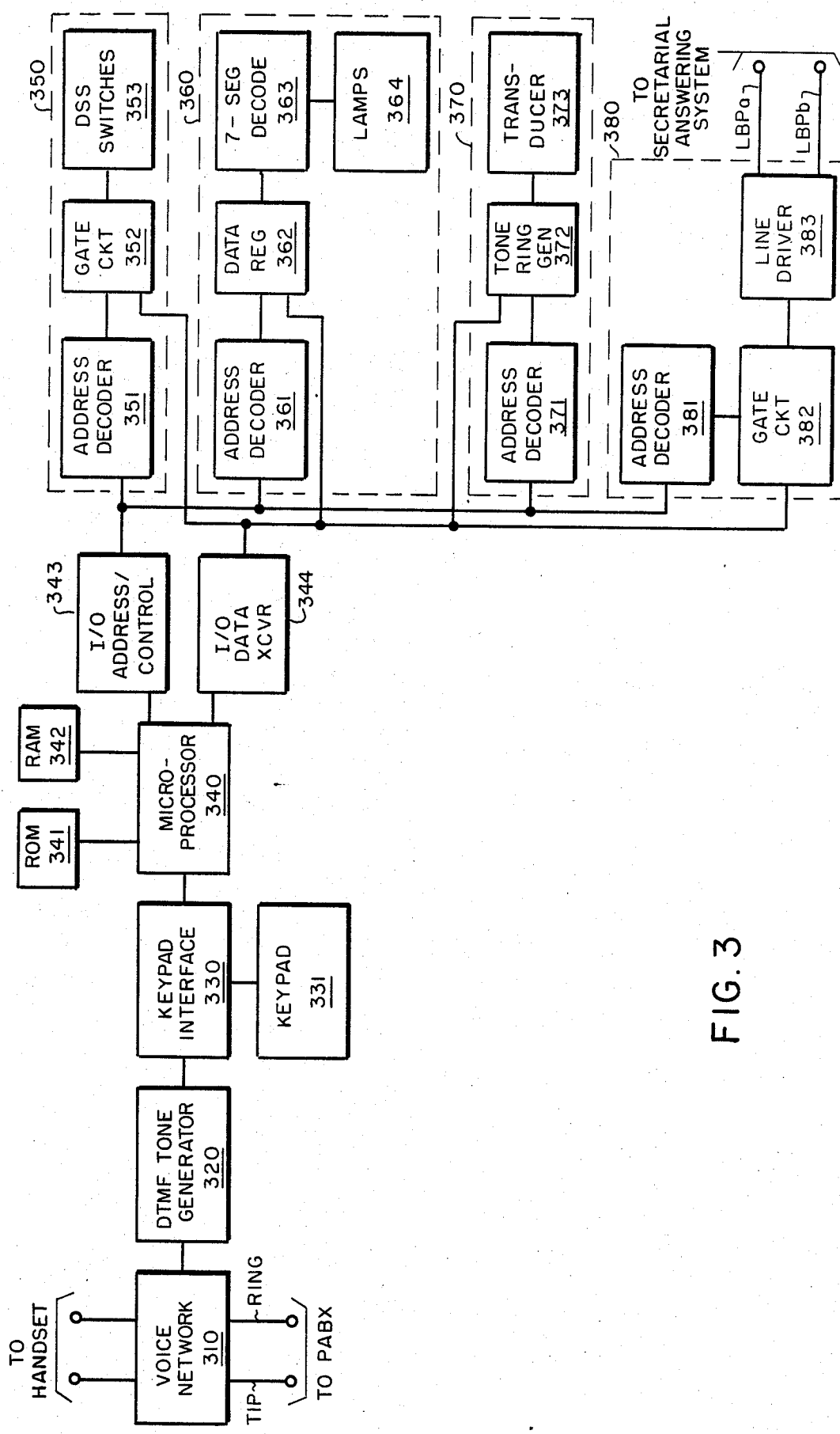
FIG. 3 is a block diagram of the secretarial telephone station shown in FIG. 1.

Referring now to FIG. 3, the block diagram of the secretarial station is shown. This secretarial station includes Voice Network 310 having Tip and Ring leads connected to the PABX of FIG. 1. This voice network is also connected to a Handset for use by the secretary. Dual tone multifrequency (DTMF) Tone Generator 320 is connected between Voice Network 310 and Key Pad Interface 330 which is further connected to Key Pad 331. Microprocessor 340 is connected to Key Pad Interface 330, ROM 341 and RAM 342. Microprocessor 340 is further connected to I/O Address/Control circuit 343 and I/O Data Transceiver 344, both of which are connected to Switch circuit 350, Lamp circuit 360, Transducer circuit 370 and Answering System Interface circuit 380.

Switch circuit 350 includes Gate circuit 352 connected between Address Decoder 351 and DSS switch 353, Lamp circuit 360 includes Data Register 362 connected between Address Decoder 361 and 7-Segment Decoder 363 which is connected to Lamps 364. Transducer circuit 370 includes Ringing Tone Generator 372 connected between Address Decoder 371 and Transducer 373. Answering System Interface circuit 380 includes Gate circuit 382 connected between Address Decoder 381 and Line Driver 383 which is connected to the Secretarial Answering System via Link Bus Protocol leads LBPa and LBPb. I/O Address/Control circuit 343 is connected to address Decoders 351, 361, 371 and 381 while I/O Data Transceiver 344 is connected to Gate circuits 352 and 382, Data Register 362 and Ringing Tone Generator 372.

As previously described, when an incoming call is received at a subscriber station, Processing Unit 100 transmits a ringing detected message to the secretarial station indicating the identity of the subscriber station that is receiving an incoming call. This message is transmitted in serial format to Interface circuit 380 via the link bus protocol (LBP) leads.

To receive this message, Microprocessor 340 applies the Read signal and address bits, representative of Interface circuit 380, to I/O Address/Control circuit 343. Address Decoder 381 enables Gate circuit 382 upon detection of its address bits. Microprocessor 340 receives the ringing detected message via I/O Data Transceiver 344, Gate circuit 382 and Line Driver 383. Microprocessor 340 stores this message in RAM 342 and subsequently retrieves it for analysis to determine its content, i.e., ringing status code and identification code for the ringing subscriber station.

Microprocessor 340 then applies a Write signal and the address bits representative of Lamp circuit 360 to I/O Address/Control circuit 343 and a lamp data bit to I/O Data Transceiver 344. Address Decoder 361, upon decoding its specific address bits, enables Data Register 362 which then stores the lamp data bit from I/O Data Transceiver 344. The stored lamp data bits are then decoded by 7-Segment Decoder 363 and the selected lamp is lit. Microprocessor 340 also applies a Write signal and the address bits representative of Transducer circuit 370 to I/O Address/Control circuit 343, and an audible signalling data bit to Data Transceiver 344. Address Decoder 371, upon decoding its specific address bits enables Ringing Tone Generator 372. This tone generator then applies a ringing control signal to Transducer 373 under control of the audible signalling data bit. Transducer 373 responds to this ringing control signal by providing a corresponding audible ringing signal. Microprocessor 340 provides these lamp and audible signalling data bits periodically in order to cause the lamps to flash and the transducer to provide periodic bursts of audible ringing signal. Since each lamp is assigned to a different subscriber station this flashing lamp and audible ringing signal indicate to the secretary that a particular subscriber station is receiving an incoming call.

When the secretary determines that an incoming call should be routed to the secretarial station, the secretary depresses the DSS switch associated with the ringing subscriber station. Operation of this switch is detected by Gate circuit 252.

Microprocessor 340 periodically scans the gate circuits in Switch circuit 350 by applying a Read signal and address bits representative of Address Decoder 351 to I/O Address/Control circuit 343. The DSS switch status from Gate circuit 352 is then transferred to I/O Data Transceiver 344. Microprocessor 340 then transfers this switch status data from I/O Data Transceiver 344 to RAM 342, and subsequently retrieves it for analysis to determine changes in switch status and the associated subscriber station identification.

Microprocessor 340 then transmits a directed call pickup message including a code representative of the PABX directed call pickup feature followed by a code identifying the subscriber station associated with the operated DSS switch. These codes are transmitted via Key Pad Interface circuit 330 to DTMF Generator 320. This interface circuit includes a gating circuit to allow either Microprocessor 340 or Key Pad 331 to provide the row and column signals necessary to cause DTMF tone generator 320 to provide corresponding DTMF tones.

In this case DTMF tone generator 320 under control microprocessor 340 transmits DTMF tone signals representative of the call transfer code and a code identifying the ringing subscriber station. These DTMF tones are transferred to the PABX via Voice Network 310 and the Tip and Ring leads.

The PABX responds to the directed call pickup message by transferring the incoming call from the called subscriber station to the secretarial station. The secretary then lifts the handset to talk to the calling party.

After screening the call, if the secretary determines that it should be received by the subscriber station that was originally called, the secretary again depresses the DSS switch associated with that telephone station. Operation of that DSS switch is again detected by Microprocessor 340 in the same manner as previously described. Upon determining the identity of the subscriber station associated with that switch, Microprocessor 340 sends a buzzing request message to Station Interface circuit 200 (FIG. 1) via Answering System Interface circuit 380.

To transmit this message, Microprocessor 340 applies a Write command and address bits representative of Answering System Interface circuit 380 to I/O Address/Control circuit 343, and data bits representative of the buzzing requested message to I/O Data Transceiver 344. When Address Decoder 381 detects its respective address bits, it enables Gate circuit 382. Microprocessor 340 then serially transmits this message via I/O Data Transceiver 344, Gate circuit 382, Line Driver 383 and Link Bus Protocol Leads LBPa and LBPb. Processing unit 100 receives this message via Station Interface circuit 200 and applies the previously described signals to the buzzer associated with the called subscriber station thereby audibly alerting that subscriber station user that the current incoming call has previously been screened by the secretary.

Microprocessor 340 also causes DTMF tones representative of the call transfer message to be transmitted via voice network 310 to the PABX. This message includes a call transfer code and a code identifying the called subscriber station. The PABX then reroutes the call from the secretarial station to the originally called subscriber station which is concurrently informed by the audible buzzing signal that this call had been screened by the secretary.

The assignment of the subscriber stations to the switches on the secretarial station is programmable as described in U.S. Pat. No. 4,453,040. The switches on the secretarial station are programmed to be secretarial answering service switches and each is assigned to one of the Line Circuits which monitors an associated subscriber station. The assignment of the switches on different secretarial stations may be the same, may vary in order, and may exclude some of the lines. The secretarial answering switch may also be intermingled with switches used to control features such as monitor on/off, etc. One of these features, Extended Group, allows the secretarial answering switches to be divided into two groups, a primary and a secondary group. The primary group of switches is always active and displayed. The secondary group of switches will be active and displayed when the Extended Group feature is on.

Referring now to FIG. 4, the I/O Address/Control circuit of FIG. 2 is shown. This circuit includes Decoder 401 connected between the microprocessor and decoders 402, 403 and 404. AND gates 405 and 406 are also connected to the microprocessor. Inverter 407 is connected between the microprocessor and AND gate 406.

Decoder 401 decodes the most significant three (3) bits of the microprocessor. When these bits produce a "011" combination, Decoder 401 provides an Enable signal which causes Decoders 402, 403 and 404 to decode the rest of the address lines. These decoders produce ten (10) device select lines which are divided between the line and station interface circuits. The BA0-BA12 address lines directly drive the individual line and station interface circuits. The Read and Write signals are derived from the R/$\overline{\text{W}}$ and phase 2 (02) signals from the microprocessor.

Referring now to FIG. 5, the I/O Data Transceiver of FIG. 2 is shown. This circuit includes Data Buffer 500 which provides a bi-directional bus to and from Microprocessor 130. It also drives and isolates the microprocessor from the line and secretary station interface circuits.

Referring now to FIG. 6, the Matrix Enable circuit of FIG. 2 is shown. This circuit includes D-type flip-flop 601 connected between NAND gate 602 and Inverter 603. Flip-flop 601 is reset by the WDTO signal which operates as a reset or clear signal. When this flip-flop is reset, a logic level 0 signal appears at its Q output. The logic level 0 signal is then inverted to a logic level 1 $\overline{\text{ENABLE}}$ signal which causes the Gate circuit of the Signalling Matrix Control Circuit to prevent the buzzing voltage (BV) signal from being applied to the Power Gate circuit.

To cause the buzzing voltage (BV) to be applied to the Power Gate circuit, Microprocessor 130 applies a logic level 1 MX-ENBL signal to the DB02 lead, and logic level 1 signals to the BA15 and BA7 address leads. When NAND gate 602 detects these logic level 1 signals, it applies a logic level 0 signal to the clock (CLK) input of D-type flip-flop 601. Since the Data (D) input of this flip-flop is connected to a +5 V source, this flip-flop provides a logic level 1 signal at its Q output when clock by the logic level 0 signal at its CLK input. Inverter 603 then provides a logic level 0 $\overline{\text{ENABLE}}$ signal to cause the buzzing voltage to be applied to the Power Gate circuit.

Figures 7, 8:
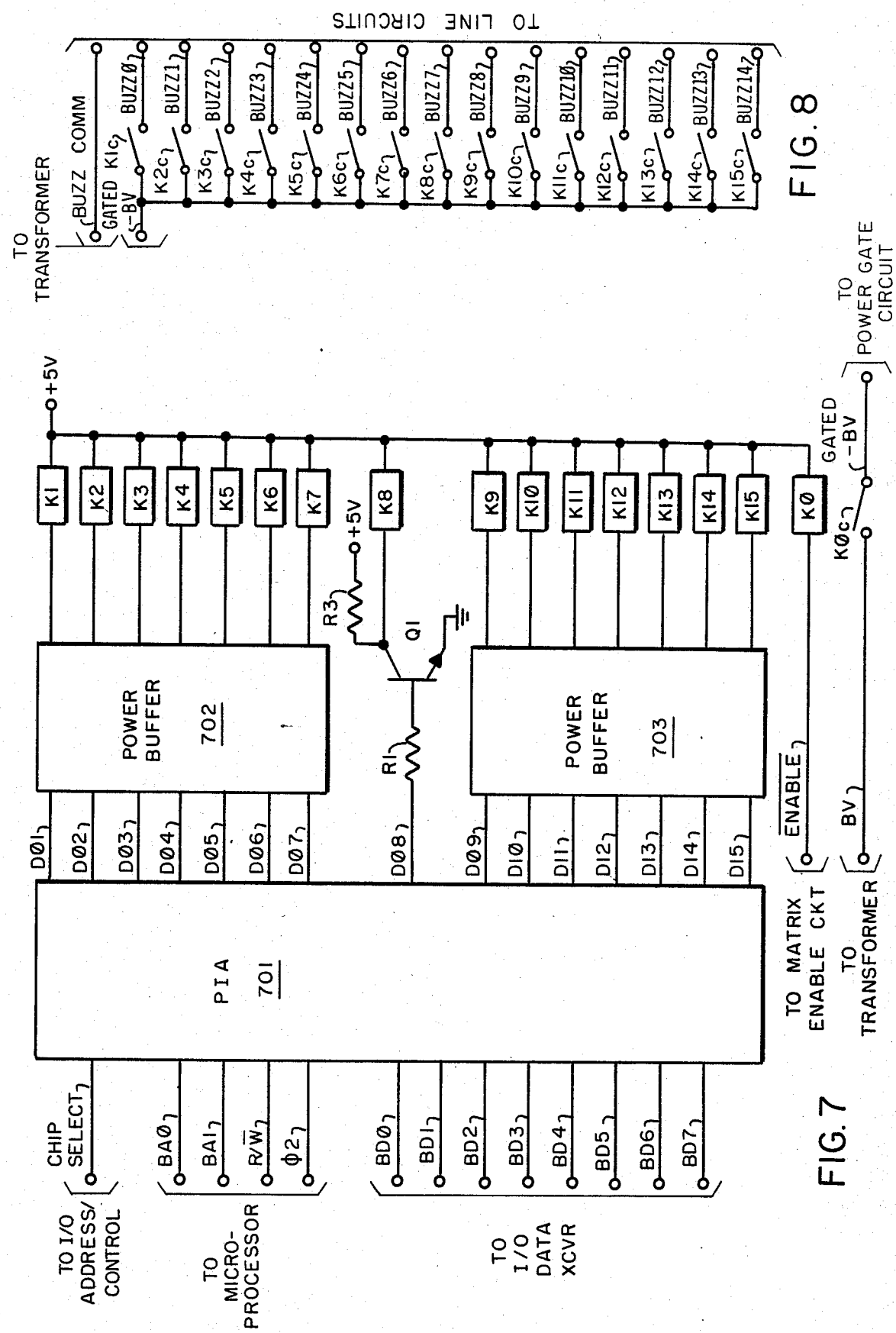
FIG. 7 is a schematic diagram of a signalling matrix control circuit corresponding to blocks 213a, b and c shown in FIG. 2.
FIG. 8 is a schematic diagram of a switching matrix corresponding to block 213d shown in FIG. 2.

Referring now to FIG. 7, the Signalling Matrix Control circuit (213a–c of FIG. 2) is shown. This circuit includes Peripheral Interface Adapter (PIA) 701 connected to Power Buffer 702, Power Buffer 703 and resister R1 which is connected to transistor Q1. Power Buffers 702 and 703 are further connected to relays K1–K7 and K9–K15, respectively, and transistor Q1 is further connected to relay K8. PIA 701 is further connected to the I/O Address/Control circuit via the Chip Select lead, the microprocessor via the BA0, BA1, R/$\overline{\text{W}}$ and phase 2 (02) (Capital 0 with a 1) 2 leads, and the I/O Data XCVR via the BD0-BD7 leads. This circuit also includes relay K0 which is connected to the Matrix Enable circuit and relay contact K0c which is connected between the Transformer and the Power Gate cirucit. PIA 701 is a double 8-bit register such as Motorola's MC6821. Power Buffers 702 and 703 are also available from Motorola.

When the microprocessor causes the Matrix Enable circuit to provide a logic level 0 $\overline{\text{ENABLE}}$ signal, relay K0 is operated and contact K0c closes. This causes the 24 VAC buzzing voltage (BV) to be applied to the Power Gate circuit. However, in order to distribute this GATED-BV signal to selected line circuits, the appropriate buzzing relay (K0–K15) must be operated.

To operate these relays the microprocessor provides address signals representative of the Signalling Matrix Control circuit. The I/O Address/Control circuit then applies a logic level 1 signal to the Chip Select lead. The microprocessor also applies logic level 1 signals to the BA0 or BA1 leads depending on whether relays K1–K8 or K9–15 are to be operated. The data to operate the relays is provided by I/O Data XCVR on the BD0–BD7 leads.

When the microprocessor provides a logic level 0 write ($\overline{\text{W}}$) signal and a logic level 1 phase 2 (02) signal to PIA 701, the data appearing on the BD0–BD7 leads is transferred to Power Buffer 702 and transistor Q, if a logic level 1 signal appears on the BA0 lead. Similarly, the data appearing on the BD0–BD7 leads is transferred to Power Buffer 703 if a logic level 1 signal appears on the BA1 lead. These Power Buffers and transistor provide the necessary driving currents to operate relays K0–K15. These relays are operated when a logic level 1 signal appears on the correspond BD lead.

Referring now to FIG. 8, the Switching Matrix (213d of FIG. 2) is shown. This circuit includes relay contacts K1–K15 which apply the buzzing signals BUZZ-0–BUZZ14 to the subscriber stations.

Figure 9:
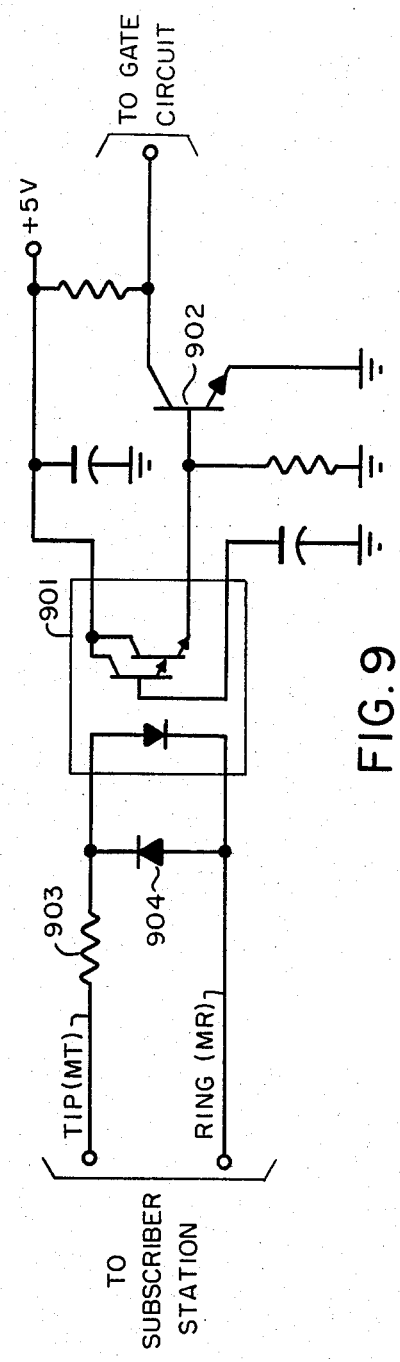
FIG. 9 is a schematic diagram of the BUSY/IDLE DETECTOR circuit shown in FIG. 2.

Referring now to FIG. 9, the Busy/Idle Detector circuit of FIG. 2 is shown. This circuit is connected in parallel across the Tip and Ring leads and includes Optical Isolator 901 and Transistor 902. The tip and ring (MT and MR) leads of the monitored subscriber station are connected to Optocoupler 901 via the series combination of resistor 903 and rectifier diode 904.

In the on-hook condition, the voltage across the Tip and Ring leads is approximately 50 VDC. This voltage drives a current through the light emitting diode of Optocoupler 901. The Darlington amplifier of Optocoupler 901 then turns on and drives transistor 902 into saturation.

In the off-hook condition, the voltage across the tip and ring leads is between 7 and 10 VDC. This voltage produces a lock current which turns off Optocoupler 901 and consequently transistor 902. The idle condition is indicated by a logic level 0 (saturated state of Transistor 902) signal and the busy condition is indicated by a logic level 1 (open state of Transistor 902) signal.

Figure 10:
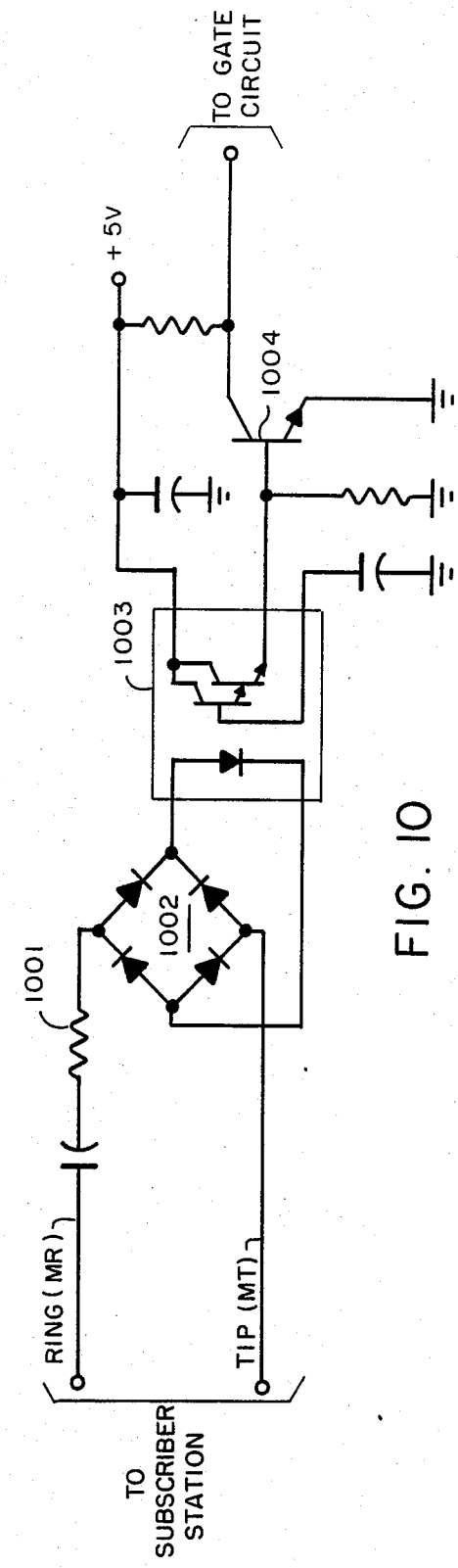
FIG. 10 is a schematic diagram of the RINGING DETECTOR circuit shown in FIG. 2.

Referring now to FIG. 10, the Ringing Detector of FIG. 2 is shown. This circuit includes resistor 1001, bridge 1002, Optocoupler 1003 and transistor 1004. The resistor and capacitors connected to Optocoupler 1003 represent signal shaping circuitry.

Resistor 1001 limits the current of the ringing signal passing through it, to 1.88 amps. Bridge 1002 rectifies this limited ringing signal and applies it to Optocoupler 1003. When this Optocoupler detects the rectified ringing signal its Darlington amplifier goes into saturation. This causes transistor 1004 to turn on and apply a logic level 0 Ringing Detected signal to Processing Unit 100. When ringing current is not present, the Darlington amplifier of Optocoupler 1003 is not saturated. Consequently, transistor 1004 is turned off and a logic level 1 signal is applied to Processing Unit 100 to indicate absence of a ringing signal.

Thus the secretarial answering system and secretarial telephone station of the present invention allow an incoming call to a particular subscriber telephone station to be routed to a secretarial station for screening. The secretary can then reroute the call to the originally called subscriber station and provide a buzzing signal to that subscriber station to indicate to that station's user that the current incoming call had been previously screened by the secretary.

It will be obvious to those skilled in the art that numerous modificiations of the present invention can be made without departing from the spirit of the invention.

What is claimed is:

1. A secretarial telephone answering system for use with a telephone switching system including a switching center, and both a secretarial telephone station and a plurality of subscriber telephone stations all connected to said switching center, said switching center being operative to apply a ringing signal to a called subscriber station, said subscriber stations being operative to provide busy and idle conditions, and said secretarial station being operative to provide a buzzing requested message, including a code identifying said called subscriber station, said telephone answering system comprising:
   a processing unit connected to said secretarial station; and
   a plurality of line circuits each connected to said processing unit and an associated one of said subscriber stations;
   each of said line circuits being operative in response to detection of said busy or idle condition, or ringing signal at an associated called subscriber station to provide a busy, idle or ringing detected signal, respectively;
   said processing unit being operative to periodically scan said line circuits for said busy, idle and ringing detected signals and upon detection thereof, being operative to apply to said secretarial station busy, idle or ringing detected messages, respectively, each including a busy, idle or ringing detected code, respectively, and a code identifying an associated subscriber station;
   said processing unit being further operative in response to said buzzing requested message to apply a buzzing control signal to the line circuit associated with said called subscriber station; and
   said line circuit being operative in response to said buzzing control signal to apply a buzzing signal to said called subscriber station.

2. A secretarial telephone answering system as claimed in claim 1, wherein each of said line circuits comprises a ringing detector operative to provide said ringing detected signal.

3. A secretarial telephone answering system as claimed in claim 2, wherein each of said line circuits further comprises a busy-idle detector operative to provide said busy and idle detected signals.

4. A secretarial telephone answering system as claimed in claim 3, wherein a source of a buzzing signal is further included, each of said line circuits further comprising:
   a signalling control circuit connected to said processing unit and operative in response to said buzzing control signal to provide a power gating enable signal for a predetermined time; and
   a power gating circuit connected to said signalling control circuit and said buzzing signal source and operative in response to said power gating enable signal to gate said buzzing signal to said called telephone station for said predetermined time.

5. A secretarial telephone answering system as claimed in claim 4, wherein there is further included a line driver connected between said processing unit and said secretarial station, and operative to transmit said ringing detected message from said processing unit to said secretarial station.

6. A secretarial telephone answering system as claimed in claim 1, wherein said processing unit comprises:
   a microprocessor;
   microprocessor storage means connected to said microprocessor;
   an input-output address and control circuit connected between said microprocessor and said line circuits;
   said microprocessor being operative to sequentially provide a plurality of address signals each selecting a different one of said line circuits, and further operative to provide a read signal with each such address signal;
   said input-output address and control circuit being operative to temporarily store each address signal and further operative in response to said read signal to provide a first control signal; and an input-output data storage circuit connected between said microprocessor and said line circuits;

each of said line circuits being operative in response to its address signal and said first control signal to store said busy, idle or ringing detected signal in said input-output data storage circuit and said microprocessor being operative to retrieve said busy, idle or ringing detected signal from said input-output data storage circuit and to store a busy, idle or ringing code and a code identifying an associated telephone station in said microprocessor storage means;

said microprocessor being subsequently operative to transmit said busy, idle or ringing detected messages, each including said busy, idle or ringing code and said code identifying the associated telephone station to said secretarial station;

said microprocessor being further operative to receive said buzzing requested message from said secretarial station and to store said code identifying said called telephone station in said microprocessor storage means;

said microprocessor being further operative to provide a write signal and the address signal selecting the line circuit associated with said called telephone station;

said input-output address and control circuit being operative to store said address signal and further operative in response to said write signal to provide a second control signal;

said microprocessor being further operative to transfer a buzzing data signal to said input-output data storage circuit which then provides a stored buzzing data signal;

said line circuit being operative in response to its address signal, said second control signal and said stored buzzing data signal to apply said buzzing signal to said called telephone station.

7. A secretarial telephone answering system as claimed in claim 5, wherein said processing unit comprises:
   a microprocessor;
   microprocessor storage means connected to said microprocessor;
   an input-output address and control circuit connected between said microprocessor and said busy-idle detectors, ringing detectors and signalling control circuits;
   said microprocessor being operative to sequentially provide a plurality of address signals each selecting a different one of said busy-idle detectors, ringing detectors and signalling control circuits, and further operative to provide a read signal with each such address signal;
   said input-output address and control circuit being operative to temporarily store each address signal and further operative in response to said read signal to provide a first control signal; and
   an input-output data storage circuit connected between said microprocessor and each of said busy-idle detectors, ringing detectors and signalling control circuits;
   each of said busy-idle and ringing detectors being operative in response to their respective address signals and said first control signal to store said busy, idle or ringing detected signal in said input-output data storage circuit and to store a busy, idle or ringing code and a code identifying an associated telephone station in said microprocessor storage means;

said microprocessor being subsequently operative to transmit said busy, idle or ringing detected messages, each including said busy, idle or ring code, respectively, and said code identifying the associated telephone station to said secretarial station via said line driver;

said microprocessor being further operative to receive said buzzing requested message from said secretarial station via said line driver and to store said code identifying said called telephone station in said microprocessor storage means;

said microprocessor being further operative to provide a write signal and the address signal selecting the signalling control circuit associated with said called telephone station;

said input-output address and control circuit being operative to store said address signal and further operative in response to said write signal to provide a second control signal;

said microprocessor being further operative to transfer a buzzing data signal to said input-output data storage circuit which then provides a stored buzzing data signal;

said signalling control circuit being operative in response to its address signal, said second control signal and said stored buzzing data signal to apply said buzzing signal to said called telephone station.

8. A secretarial telephone answering system as claimed in claim 7, wherein said microprocessor storage means comprises a random-access-memory.

9. A secretarial telephone answering system as claimed in claim 7, wherein said input-output address and control circuit comprises an address register.

10. A secretarial telephone answering system as claimed in claim 7, wherein said input-output data storage circuit comprises a data register.

11. A secretarial telephone answering system as claimed in claim 6, wherein there is further included:
    a clock circuit operative to provide a plurality of sequentially occurring clock pulses;
    a watch dog timer connected between said clock circuit and said microprocessor;
    said microprocessor being operative to periodically provide a reset signal;
    said watch dog timer being operative in response to a predetermined number of clock pulses occurring between two successive reset pulses to provide a watch dog time out signal; and
    a logic gating circuit connected between said watch dog timer and said line circuit and operative in response to said watch dog time out signal to provide a buzzing disable signal;
    said line circuit being operative in response to said buzzing disable signal to inhibit application of said buzzing signal to said called telephone station.

12. A secretarial telephone answering system as claimed in claim 11, wherein said microprocessor is further operative to provide a logic gating disable signal; said logic gating circuit being further operative in response to said logic gating disable signal to provide said buzzing disable signal.

13. A secretarial telephone answering system as claimed in claim 7, wherein there is further included:
    a clock circuit operative to provide a plurality of sequentially occurring clock pulses;

a watch dog timer connected between said clock circuit and said microprocessor;

said microprocessor being operative to periodically provide a reset signal;

said watch dog timer being operative in response to a predetermined number of clock pulses occurring between two successive reset pulses to provide a watch dog time out signal; and a logic gating circuit connected between said watch dog timer and said signalling control circuit and operative in response to said watch dog time out signal to provide a buzzing disable signal;

said signalling control circuit being operative in response to said buzzing disable signal to inhibit application of said power gating enable signal.

14. A secretarial telephone answering system as claimed in claim 4, wherein said signalling control circuit comprises a monostable multivibrator.

* * * * *